United States Patent
Carmichael (12) 
(10) Patent No.: US 11,574,071 B2
(45) Date of Patent: Feb. 7, 2023

(54) RELIABILITY OF INFORMATION SECURITY CONTROLS FOR ATTACK READINESS

(71) Applicant: Bank of America Corporation, Charlotte, NC (US)

(72) Inventor: Martin A. Carmichael, Aubrey, TX (US)

(73) Assignee: Bank of America Corporation, Charlotte, NC (US)

( * ) Notice: Subject to any disclaimer, the term of this patent is extended or adjusted under 35 U.S.C. 154(b) by 283 days.

(21) Appl. No.: 16/941,093

(22) Filed: Jul. 28, 2020

(65) Prior Publication Data

US 2022/0035938 A1    Feb. 3, 2022

(51) Int. Cl.
*G06F 16/245*    (2019.01)
*G06F 21/62*    (2013.01)
*H04L 9/40*    (2022.01)
*G06F 21/57*    (2013.01)

(52) U.S. Cl.
CPC ........ *G06F 21/6227* (2013.01); *G06F 16/245* (2019.01); *G06F 21/577* (2013.01); *H04L 63/1416* (2013.01); *H04L 63/1441* (2013.01); *H04L 63/20* (2013.01)

(58) Field of Classification Search
CPC . H04L 63/20; H04L 63/1441; H04L 63/0263; H04L 41/145; H04L 43/045; H04L 41/142
See application file for complete search history.

(56) References Cited

U.S. PATENT DOCUMENTS

| | | | |
|---|---|---|---|
| 6,895,558 B1 | 5/2005 | Loveland | |
| 8,201,257 B1* | 6/2012 | Andres | G06F 21/568 726/25 |
| 8,406,399 B2 | 3/2013 | Loveland | |
| 8,516,596 B2 | 8/2013 | Sandoval et al. | |
| 8,832,832 B1 | 9/2014 | Visbal | |
| 9,100,428 B1 | 8/2015 | Visbal | |

(Continued)

FOREIGN PATENT DOCUMENTS

CN    107579855 A   *   1/2018

OTHER PUBLICATIONS

Chris Kissel, "IBM QRadar 7.3.1 with UBA 3.0", Mar. 2019, obtained from <https://www.ibm.com/downloads/cas/MN4WK4EN>, retrieved on Jul. 1, 2022 (Year: 2019).*

*Primary Examiner* — Jeffery L Williams
*Assistant Examiner* — Zhimei Zhu (57) ABSTRACT

A target device stores secure information and one or more security tools configured to protect against unauthorized access of the secure information. A first database stores profiles for each of a set of predefined attack groups. Each profile includes a set of attack techniques used by the corresponding attack group and, for each attack technique, a corresponding set of mitigations. A second database stores control policies. Each control policy is associated with a set of security tools that protect against unauthorized access of the secure information stored by the target device. A controls monitor determines an attack controls superset based on the profiles and control policies. A controls health dashboard receives a user query and provides a representation of a portion of the attack controls superset that is associated with the received query.

17 Claims, 4 Drawing Sheets

(56) References Cited

U.S. PATENT DOCUMENTS

| | | |
|---|---|---|
| 9,100,430 B1 | 8/2015 | Seiver et al. |
| 9,160,766 B2 | 10/2015 | Kashyap et al. |
| 9,171,253 B1 * | 10/2015 | Wright .................... G06N 5/02 |
| 9,241,009 B1 | 1/2016 | Starink et al. |
| 9,258,321 B2 | 2/2016 | Amsler et al. |
| 9,386,041 B2 | 7/2016 | Carver et al. |
| 9,560,066 B2 | 1/2017 | Visbal |
| 9,672,355 B2 | 6/2017 | Titonis et al. |
| 9,680,861 B2 | 6/2017 | Ward et al. |
| 9,686,297 B2 | 6/2017 | Starink et al. |
| 9,749,356 B2 | 8/2017 | Bailey et al. |
| 9,767,291 B2 | 9/2017 | Hoernecke et al. |
| 9,807,120 B2 | 10/2017 | Carver et al. |
| 9,923,917 B2 | 3/2018 | Fausto et al. |
| 9,973,046 B2 | 5/2018 | Dinulovic et al. |
| 10,051,010 B2 | 8/2018 | Carver et al. |
| 10,063,583 B2 | 8/2018 | Watters et al. |
| 10,230,746 B2 | 3/2019 | Visbal |
| 10,248,910 B2 | 4/2019 | Crabtree et al. |
| 10,284,583 B2 | 5/2019 | Kasahara |
| 10,284,588 B2 | 5/2019 | Solow et al. |
| 10,313,385 B2 | 6/2019 | Shakarian et al. |
| 10,326,791 B2 | 6/2019 | Starink et al. |
| 10,412,104 B2 | 9/2019 | Boss et al. |
| 10,454,950 B1 | 10/2019 | Aziz |
| 10,530,806 B2 | 1/2020 | Starink et al. |
| 10,601,848 B1 | 3/2020 | Jeyaraman et al. |
| 11,003,773 B1 * | 5/2021 | Fang .................... G06K 9/6262 |
| 2004/0230689 A1 | 11/2004 | Loveland |
| 2014/0075530 A1 | 3/2014 | Novack et al. |
| 2015/0121532 A1 | 4/2015 | Barel |
| 2016/0057166 A1 | 2/2016 | Chesla |
| 2017/0041337 A1 | 2/2017 | Hoog |
| 2017/0118241 A1 * | 4/2017 | Call .................... H04L 67/535 |
| 2018/0025157 A1 | 1/2018 | Titonis et al. |
| 2018/0270264 A1 | 9/2018 | Cohen et al. |
| 2018/0343277 A1 * | 11/2018 | Drihem .............. H04L 63/1441 |
| 2019/0036958 A1 | 1/2019 | Shi |
| 2019/0158515 A1 | 5/2019 | Visbal |
| 2019/0166137 A1 | 5/2019 | Mendes et al. |
| 2020/0076848 A1 | 3/2020 | Starink et al. |

\* cited by examiner

RELIABILITY OF INFORMATION SECURITY CONTROLS FOR ATTACK READINESS

TECHNICAL FIELD

The present disclosure relates generally to data security systems. More particularly, in certain embodiments, the present disclosure is related to the reliability of information security controls for attack readiness.

BACKGROUND

Information intended to be kept secure may be stored electronically. However, computer systems and associated electronically stored information may be susceptible to a range of attacks intended to compromise the secure information. For example, a database of secure information may be susceptible to an attack aiming to access and store a copy of the secure information.

SUMMARY

In an embodiment, a system includes a target device storing secure information and one or more security tools configured to protect against unauthorized access of the secure information. The system includes a first database (e.g., an attack database) configured to store profiles for each of a set of predefined attack groups. Each profile includes a set of attack techniques used by the corresponding attack group and, for each attack technique, a corresponding set of mitigations. Each mitigation of the set of mitigations corresponds to a predefined approach to protecting against the attack technique. Each attack technique corresponds to an approach to accessing the secure information stored by the target device. The system includes a second database (e.g., a controls database) configured to store control policies. Each control policy is associated with a set of security tools that protect against unauthorized access of the secure information stored by the target device. Each security tool is configured (e.g., using software and/or hardware) to implement at least one mitigation of the set of mitigations included in the profiles. The system includes a controls monitoring device coupled to the first database and the second database. The controls monitor receives the profiles from the first database and receives the control policies from the second database. Based on the received profiles and the received control policies, an attack controls superset is determined. The attack controls superset includes the set of predefined attack groups, the set of attack techniques, the set of mitigations, and the set of security tools. A controls health dashboard (e.g., implemented by the same device as the controls monitor or another device) receives a user query associated with one or more of the controls policies or the attack groups. The controls health dashboard provides a representation (e.g., a table, list, graph, etc.) of a portion of the attack controls superset that is associated with the received query.

In some cases, information may be available about currently known attack strategies for compromising secure information and the types of mitigations which may be employed to protect against these strategies. For instance, information may be available about known attack groups and the characteristics of attacks commonly performed by these groups. Separate information may also be available for the mitigations which may be employed to protect against certain types of attacks. Meanwhile, entities seeking to protect their computer systems and secure information may employ a broad range of tools in an attempt to mitigate certain attacks and satisfy a variety of internal rules and/or externally imposed regulations. For instance, tools may scan for known threats or aid in the identification of known attacks. However, for a given entity, the implementation of tools may be disjointed between different groups functioning within the entity, such that the information about the execution and performance of these tools is highly siloed. For example, different groups may deploy tools differently because of the different regulatory frameworks encountered by the different groups, the different attacks to which the groups may be susceptible, the type of information handled by the different groups (e.g., the security level of information handled by the groups), the different strategies preferred by decision-makers in the groups, and the like. Using previous technology, little to no information is available regarding the attack readiness of groups at an entity or the entity as a whole.

This disclosure recognizes the previously unidentified need to efficiently evaluate how prepared an entity, or group at an entity, is to various attacks and/or attack groups. Certain embodiments of this disclosure satisfies this unmet need and solves problems of previous technology by facilitating the determination of a readiness to protect against a range of possible attacks. For example, the disclosed system provides several technical advantages, which include: 1) providing an approach to mapping the many-to-many relationships between identified attacks, for instance, from different attack groups and the established control policies employed by an entity or group; 2) identifying which existing control policies are associated with protecting against certain attacks and/or attack groups; and 3) determining scores measuring the effectiveness of in-place security tools to protect against attacks. As such, this disclosure may improve the function of computer systems used to measure how effective a given policy and/or security tool is at protecting against a given attack type and/or attack group. The system may also or alternatively reduce or eliminate practical and technical barriers or bottlenecks to evaluating attack readiness, particularly in environments with a variety of tools in place to mitigate a large number of attacks from a variety of possible attack groups. The systems described in this disclosure may particularly be integrated into a practical application of a controls health dashboard, which uses the specially mapped attack and mitigation information to efficiently provide user-friendly representations of attack readiness based on a user query. The controls health dashboard allows even non-expert users to evaluate the often complex inter-relationships between existing security tools (or associated control policies) and possible attacks (and/or the associated attacks groups), which otherwise go undetected and thus unreported by previous technology. Thus, the controls health dashboard may facilitate the user-friendly and efficient determination of attack readiness for a given mitigation tool or control policy, the detection of possible gaps in attack readiness, the identification of additional data which may be helpful for improving analysis of attack readiness, and the like.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description.

DETAILED DESCRIPTION

Figure 1:
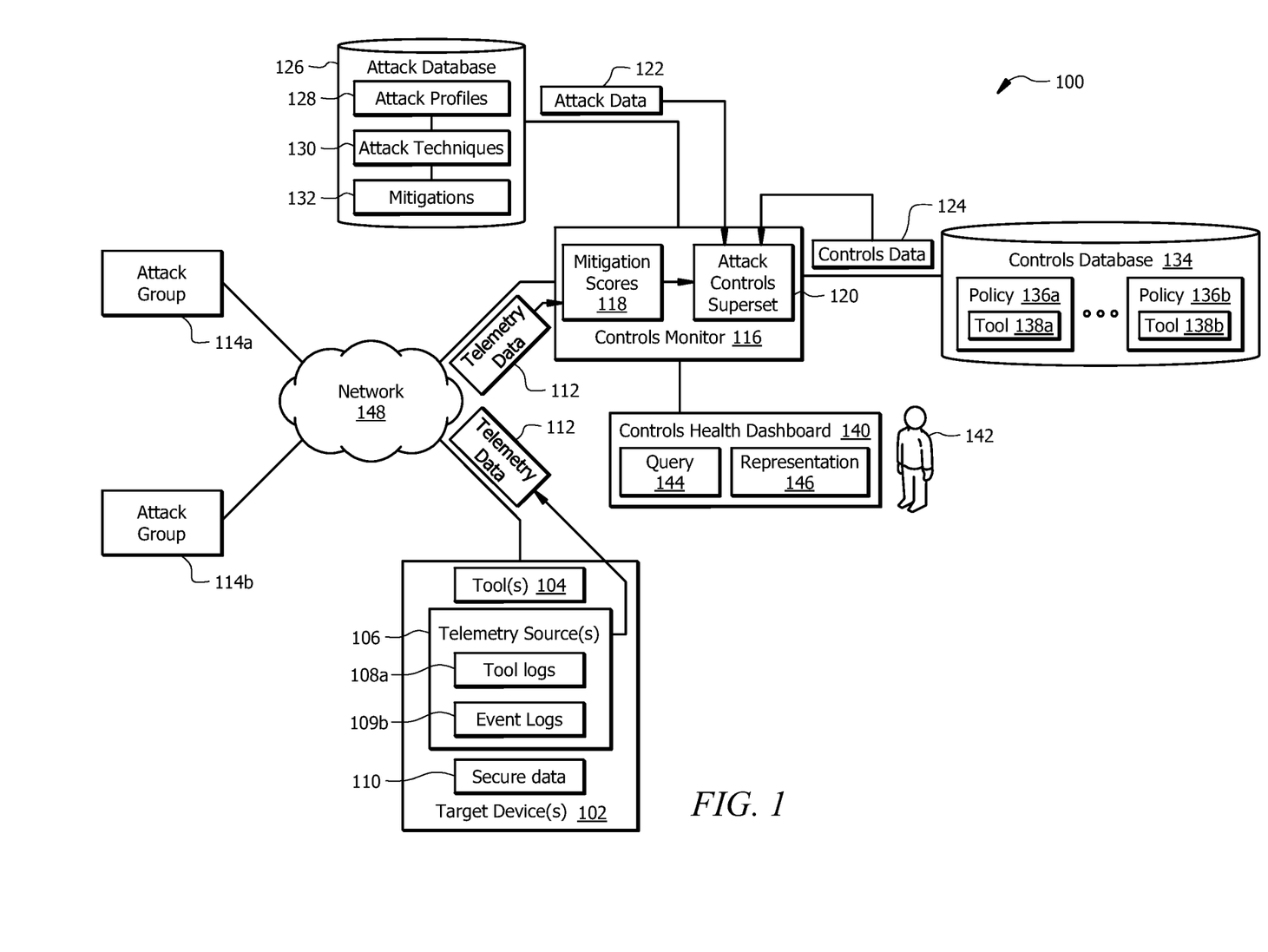
FIG. 1 is a schematic diagram of an example system for evaluation of attack readiness based on determination of an attack controls superset.
Figure 2:
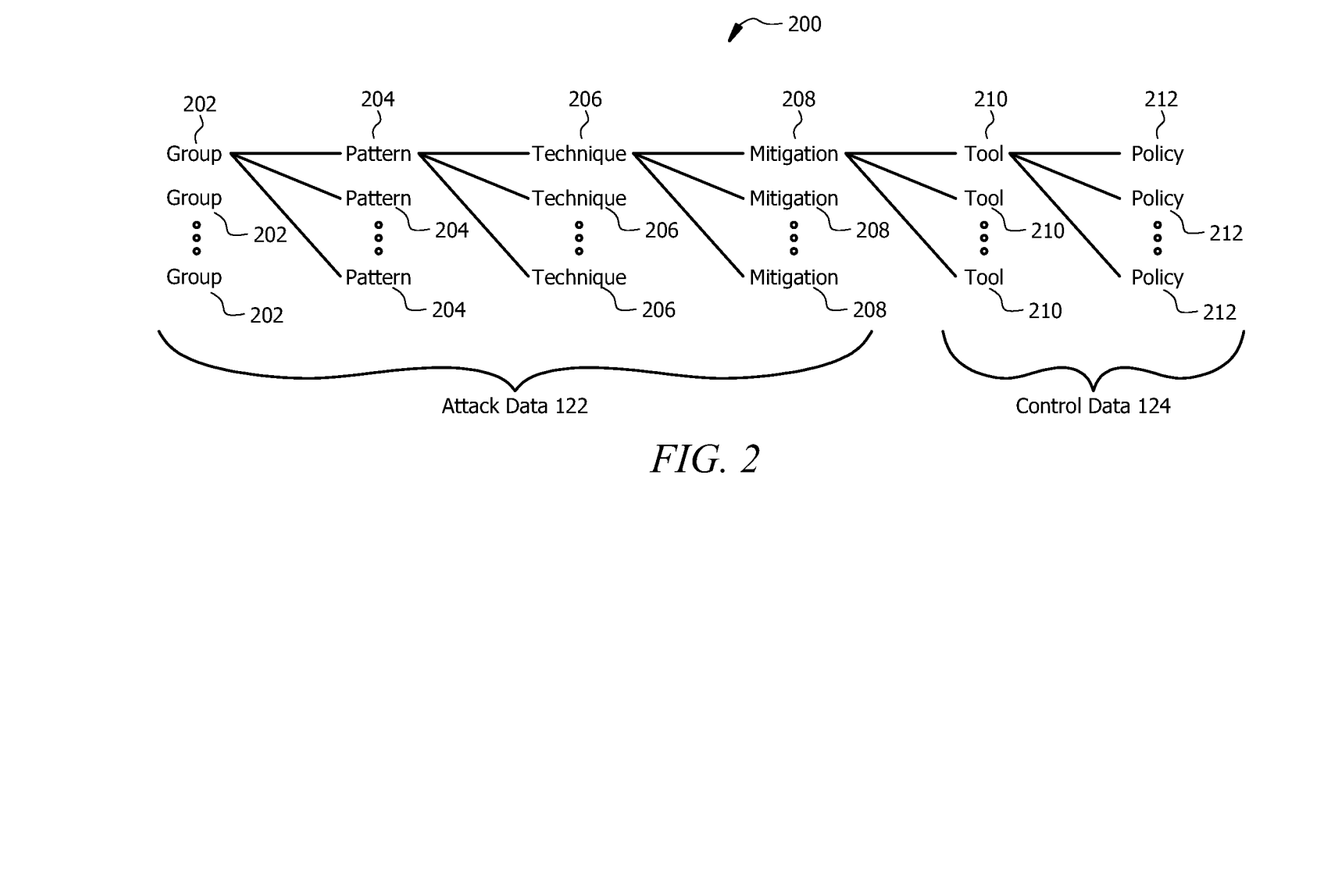
FIG. 2 is a schematic diagram illustrating inter-relationship between different attack and mitigation information included in the attack controls superset of FIG. 1.
Figure 3:
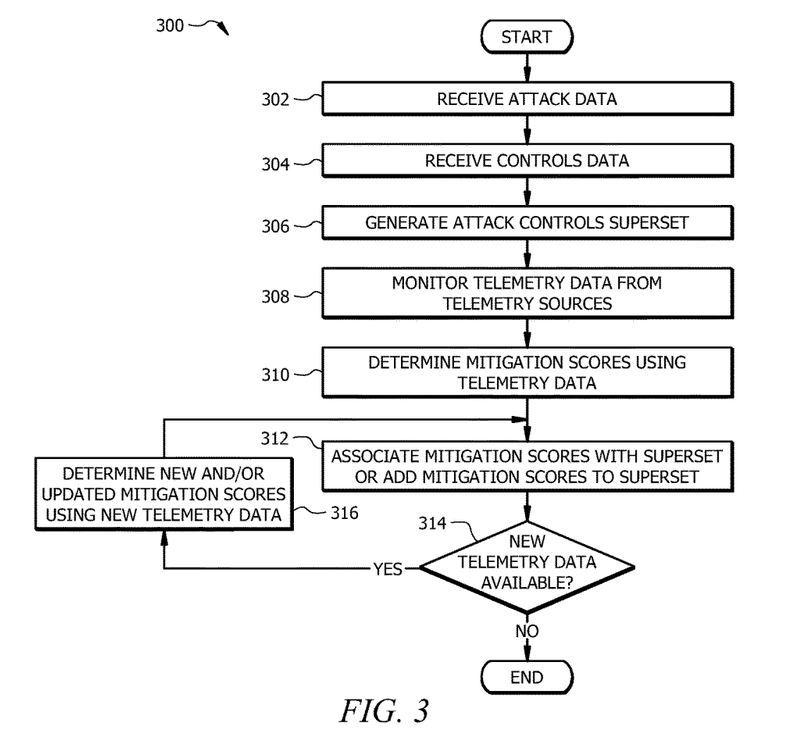
FIG. 3 is flowchart of an example method for determining the attack controls superset of FIG. 1.
Figure 4:
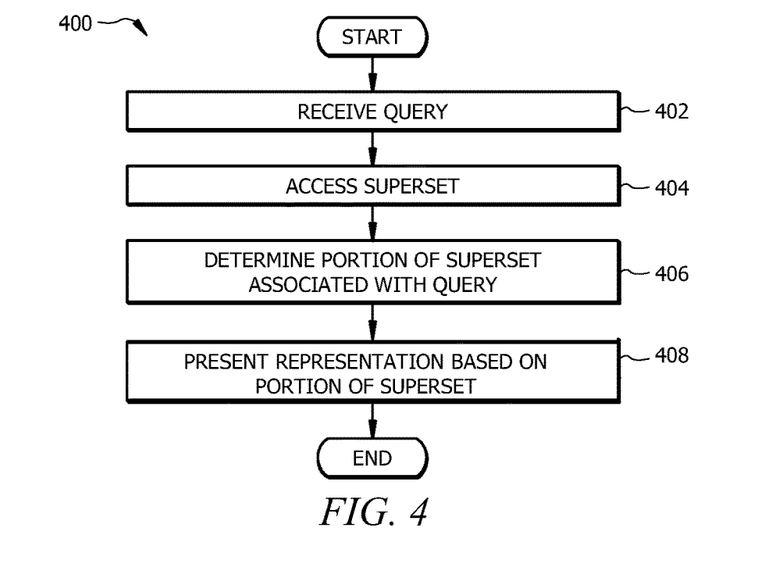
FIG. 4 is a flowchart of an example method of operating the control health dashboard of FIG. 1.
Figure 5:
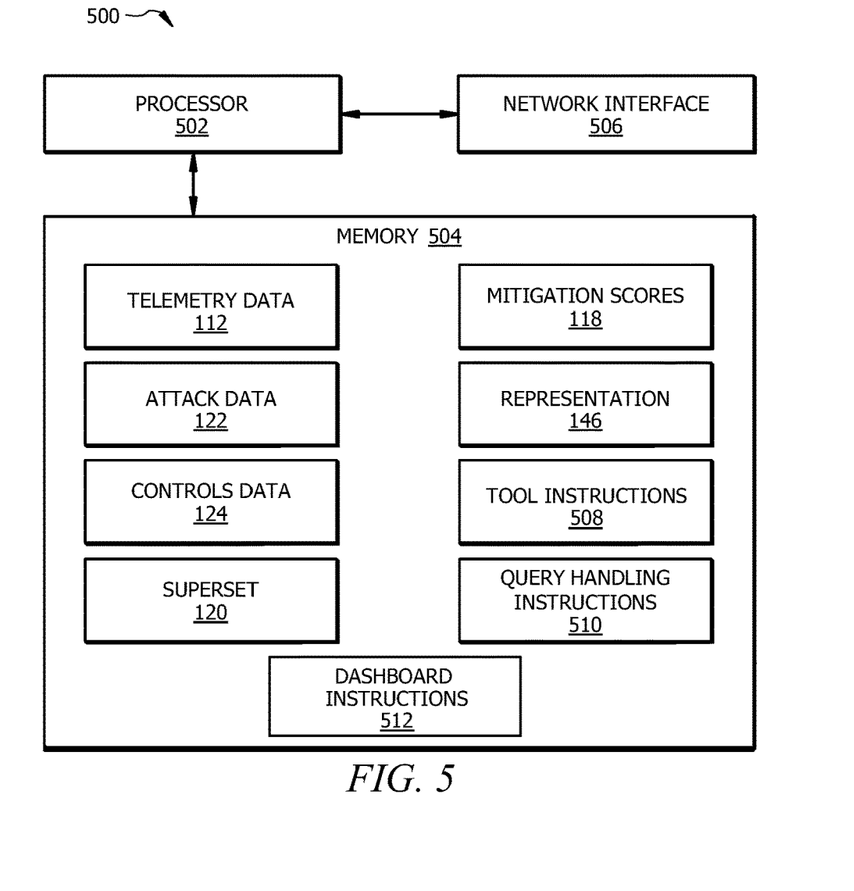
FIG. 5 is a diagram of an example device configured to implement at least certain components of the system of FIG. 1.

As described above, previous technology fails to provide efficient and reliable measures of attack readiness. This disclosure provides a specially determined attack controls superset which includes both attack-side and mitigation-side information and accounts for the complex inter-relationships between this information. A controls health dashboard may use this superset to provide user-requested assessments of attack readiness on an as-needed basis. For instance, mitigation scores may be determined for certain security tools based on the effectiveness of these tools for protecting against known attack types. Previous technology fails to provide such information. FIG. 1 illustrates a system for attack readiness determination based on an attack controls superset. FIG. 2 illustrates the inter-relationships between the various data included in the attack controls superset. FIG. 3 illustrates a method for determining and updating the attack controls superset. FIG. 4 illustrates a method for operating an example controls health dashboard. FIG. 5 illustrates a device for implementing various components of the system of FIG. 1.

System for the Assessment of Attack Readiness

FIG. 1 is a schematic diagram of an example system 100 for evaluating attack readiness of one or more target devices 102 to attacks by one or more of attack groups 114a,b. The system 100 includes one or more target devices 102, one or more attack groups 114a,b, a controls monitor 116, an attack database 126, a controls database 134, a controls health dashboard 140, and a network 148. As described in greater detail below with respect to FIGS. 3 and 4, the system 100 generally facilitates the determination of an attack controls superset 120 which facilitates the efficient mapping between known various attack profiles 128 and existing and/or in-development control policies 136a,b intended to protect against attacks. An attack corresponds to any undesired attempt to access, intercept, or otherwise compromise electronically stored secure information 110 in a target device 102. Examples of attacks and associated information include those associated with the MITRE ATT&CK® framework.

The target device(s) 102 may include any computing device or collection of computing devices configured to implement a security tool 104. For instance, a target device 102 may be an individual computing device that is used to access secure information. The target device 102 may be implemented using the processor, interface, and memory of the device 500 described with respect to FIG. 5 below. The security tool(s) 104 for a target device 102 may include software and/or hardware designed to protect against or prevent unauthorized access of the device 102 (e.g., software requiring authentication before a user operates the device 102), to detect suspicious files or file types installed on the device 102 (e.g., anti-virus software), to flag suspicious communications on the device (e.g., software to detect suspicious email communications), and the like. In some embodiments, a target device 102 is a server configured to store secure data 110. The security tools 104 may include software and/or hardware designed to detect and/or protect against unauthorized access of the secure information/data 110 (e.g., software requiring authentication before access to secure data 110 is provided).

Each target device 102 generally includes one or more telemetry sources 106. A telemetry source 106 is a source of telemetry data 112. Telemetry data 112 is generally information which is associated with tasks performed by the security tools 104 and can provide information about the effectiveness of the tools 104 at protecting against attacks by the attack groups 114a,b. Telemetry data 112 may correspond to events associated with previous attacks or attack attempts on the target device 102. For example, the telemetry sources may include tool logs 108a and/or event logs 108b. The tool logs 108a may include a record of actions performed by the tool(s) 104. For instance, a tool log 108 may include a record of log-in verifications performed by a tool 104, a record of communications reviewed by the tool 104, a record of threats detected by tool 104, a record of corrective actions taken by the tool 104, and the like. The event logs 108b may include a record of other known events associated with the target device 102. For instance, the event log 108b may include a record of the usage of the target device 102 by one or more users (e.g., a record of access to secure data 110 stored by the device 102). The event log 108b may include a record of known events associated with the target device 102, such as a record of known attacks on the device 102 (e.g., attacks identified by the tool 104 and/or a user and recorded in the event log 108b). At least a portion of the information from the telemetry sources 106 is provided to the controls monitor 116, which is described further below.

The attack groups 114a,b are generally any groups associated with known attacks. Each attack group 114a,b may be associated with any number of individuals and may use any number of devices to implement attacks. For instance, attack groups 114a,b may be associated with organizations, governments, and the like who are known to be associated with attacks on secure data 110. Attacks by attack groups 114a,b may be associated with compromise of information stored on and/or accessed by the target device(s) 102. The attack database 126 (described further below) generally stores predetermined information (e.g., attack profiles 128, attack techniques 130, and mitigations 132) associated with attacks which are known to be performed by the attack groups 114a,b.

The controls monitor 116 is any computing device or collection of computing devices configured to determine mitigation scores 118 and determine attack control superset 120. The controls monitor may be implemented using the processor, memory, and interface of the device 500 described below with respect to FIG. 5. The controls monitor 116 receives telemetry data 112 and uses the telemetry data 112 to determine the mitigation scores 118. The mitigation scores 118 are generally measures of the effectiveness of the tools 104 by deployed target devices 102 at protecting against attacks. The mitigation scores 118 may be determined using information from the tool logs 108a and event logs 108b included in the telemetry data 112. For example, the mitigation scores 118 may correspond to a percentage of attacks associated with a given mitigation 132 and/or attack technique 130 successfully prevented by the tools 104. Examples of the determination of mitigation scores 118 are described in greater detail below and with respect to FIG. 3.

The attack controls superset 120 is determined from attack data 122 received from the attack database 126 and controls data 124 received from the controls database 134. The attack controls superset 120 generally facilitates the efficient and user-friendly mapping between portions of the attack data 122 and related portions of the control data 124. For example, the attack controls superset 120 may facilitate the efficient mapping of a particular control policy 136a,b (described further below) to related attack groups 114a,b or attack techniques 130, which may be protected against by the control policy 136a,b. Examples of determination of the attack controls superset 120 are described in greater detail below and with respect to FIG. 3.

There is generally a complex many-to-many inter-relationship between the different forms of attack data 122 and control data 124, and previous technology fails to provide a framework for efficiently identifying these relationships and facilitating the efficient and user-friendly mapping amongst these relationships. FIG. 2 is a diagram 200 illustrating the many-to-many relationships between attack data 122 (i.e., information associated with the types and characteristics of attacks by attack groups 114a,b) and controls data 124 (i.e., information associated control policies 136a,b intended to protect against attacks). As illustrated in FIG. 2, a set of attack groups 202 (e.g., which may include attack groups 114a,b of FIG. 1) may be associated with a set of attack patterns 204. The attack patterns 204 may correspond to properties of attacks on a target device 102. For example, for a given attack group 202, possible attack patterns 204 may include types of target devices 202 commonly targeted by the group 202. Each attack pattern 204 may in turn be associated with a set of attack techniques 206 (e.g., attack techniques 130 of FIG. 1). The attack techniques 206 generally correspond to methods used in an attempt to compromise secure data 110 by the attack group 202. For example, an attack technique 206 may correspond to a known file or file type that may be used at least in part to compromise secure data 110 stored in a target device 102. Each attack technique 206 may in turn be associated with a set of mitigations 208 (e.g., mitigations 132 of FIG. 1). The mitigations 208 generally correspond to approaches for protecting against attacks performed using the associated attack technique 206. For example, a mitigation 208 may correspond to a method of protecting against the related attack technique 206. The sets of attack groups 202, attack patterns 204, attack techniques 206, and mitigations 208 included in the attack data 122 may be predetermined and/or updated at intervals, for example, when new attack groups 202, attack patterns 204, attack techniques 206, and/or mitigations 208 are identified. For instance, an attack profile 128 (described further below) may be updated in the attack database 126 of FIG. 1 to reflect changes to the attack data 122.

Still referring to FIG. 2, the attack data 122 is also linked to the controls data 124, which may be received from the controls database 134 of FIG. 1. For instance, each of the predefined mitigations 208 may be associated with a set of tools 210 (e.g., tools 104 of FIG. 1). The tools 210 generally correspond to software or code for implementing one or more methods associated with the related mitigation 208 in order to protect against an attack that uses the attack technique 206. A given tool 210 may be associated with a set of one or more control policies 212 (e.g., control policies 136a,b of FIG. 1). Previous technology lacks tools for efficiently and reliably mapping the many-to-many relationship between the various attack data 122 and controls data 124, such that the previous technology is unable to provide insights into how a given portion of the controls data 124 (e.g., a particular control policy 212) is related to a given portion of the attack data 122 (e.g., an attack group 202). The new attack controls superset 120 of FIG. 1 uniquely facilitates the efficient mapping between and amongst the various sets of attack groups 202, attack patterns 204, attack techniques 206, mitigations 208 included in the attack data 122 and the sets of security tools 210 and control policies 212 included in the controls data 124.

Returning to FIG. 1, the attack database 126 includes one or more databases (e.g., data warehouses or data stores of any kind) storing the attack data 122 associated with known attacks. For example, the attack data 122 may include the attack profiles 128. The attack profiles 128 generally include information about attacks known to be performed by the attack groups 114a,b. For instance, the attack profiles 128 may link the known attack groups 114a,b to predefined attack techniques 130 and one or more known mitigations 132 for these attack techniques 130. The attack database 126 may include information from the MITRE ATT&CK® framework and/or any other appropriate source of attack data 122. The attack database 126 may be implemented using the processor, memory, and interface of the device 500 described below with respect to FIG. 5.

The controls database 134 includes one or more databases (e.g., data warehouses or data stores of any kind) storing information associated with the various controls managed by the controls monitor 116. The controls database 134 stores information about the security policies 136a-b and associated tools 138a-b employed to protect target devices 102 against attacks. The controls database 134 may be implemented using the processor, memory, and interface of the device 500 described below with respect to FIG. 5.

The controls health dashboard 140 is generally a tool implemented using software and/or hardware for facilitating presentation of information included in the attack controls superset 120. The controls health dashboard 140 receives a query 144 from a user 142 and provides a corresponding representation 146. The representation 146 is generally a representation (e.g., a list, table, graph, etc.) of a portion of the controls superset that is related to the query 144. For example, in response to a query 144 requesting a representation of attack readiness of a given controls policy 136a,b, may provide a list of attack techniques 130 and mitigation scores 118 for the tools 138a,b of the controls policy 136a,b that may be used to protect against an attack that employs the attack techniques 130 (see example representation 146 shown in TABLE 3, which is described further below). The controls health dashboard 140 may be accessed via a web portal, an application, or the like. The controls health dashboard 140 may be implemented using the processor, memory, and interface of the device 500 described below with respect to FIG. 5. For example, the controls health dashboard 140 may be implemented in the same device as that used to implement the controls monitor 116 or on a separate device (e.g., any device operated by the user 142).

Network 148 facilitates communication between and amongst the various components of the system 100. This disclosure contemplates network 148 being any suitable network operable to facilitate communication between the components of the system 100. Network 148 may include any interconnecting system capable of transmitting audio, video, signals, data, messages, or any combination of the preceding. Network 148 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. In an example operation of the system 100, the controls monitor 116 receives attack data 122 from the attack database 126 and controls data 124 from the controls database 134. The attack data 122 may include a set G of identifiers of possible attack groups 114a,b, a set A of identifiers of possible attack patterns (e.g., attack patterns 204 of FIG. 2, which may be included in the attack profiles 128), a set T of identifiers of possible attack techniques 130, and a set M of identifiers of possible mitigations 132 (e.g., mitigations 208 of FIG. 2). The controls data 124 may include a set D of possible tools 138a,b for protecting against attacks, a set X of identifiers of sources 106 of telemetry data 112 and a set P of identifiers of the controls policies 136a,b included in the controls database 134. The controls monitor 116 uses these attack data 122 and controls data 124 to generate the attack controls superset 120. For instance, the controls monitor 116 may determine a union XP of the set X of identifiers of sources 106 of telemetry data 112 and the set P of identifiers of the controls policies 136a,b included in the controls database 134 (i.e., such that XP=X∪P). The attack controls superset 120 ($\varphi$) may then be determined according to:

$$\varphi = G \times A \times T \times M \times D \times XP.$$

The controls monitor 116 may further monitor telemetry data 112 from a target device 102 associated with the controls monitor 116, use this telemetry data 112 to determine mitigation scores 118 associated with the effectiveness of tools 104 implemented by the target device 102 at successfully protecting against attacks, and include or link these mitigation scores 118 with the attack controls superset 120. As described above, the telemetry data 112 generally reflects an extent to which tools 104 implementing mitigations 132 protect against attacks. For example, tool logs 108a may include a list of actions taken by the tool 104 to protect against or prevent attacks (e.g., checking for the presence of software and/or electronic communications known to be associated with certain attack techniques 130), a number of attacks detected, and a number of attacks prevented. The telemetry data 112 may include this information, and the controls monitor 116 may calculate a mitigation score 118 based on the percentage of the attacks that are prevented based on this information from the tool log 108a. As another example, the event log 108b may include a list of events associated with possible attempts to access the secure data 110 using a known attack technique 130, and the tool log 108a may include the list of the number of attacks detected for the known attack technique 130. After the controls monitor receives this information in the telemetry data 112, the controls monitor 116 may detect events associated with possible attempts to access the secure data 110 using one of the attack techniques 130, determine a mitigation 132 that corresponds to the attack technique 130 and a corresponding tool 104 being executed by the target device 102 to implement the determined mitigation 132, and determine the mitigation score 118 as a percentage of the detected events prevented by the determined tool 104. In some cases, updated telemetry data 112 may be provided to the controls monitor 116 such that the mitigation scores can be updated over time to reflect changes in tool performance.

Following determination of the attack controls superset 120 and mitigation scores 118, a user 142 may operate the controls health dashboard 140 to request information using a query 144 related, for example, to the readiness of the various controls policies 136a,b and/or tools 138a,b for protecting against various attacks (e.g., attack groups 114a,b and/or attack techniques 130) and/or for implementing various mitigations 132. Because the attack controls superset 120 is specially structured to facilitate the efficient mapping between the various attack data 122 and controls data 124, the user 142 does not require any specialized knowledge to obtain useful information from the attack controls superset 120.

In one example of operating the controls health dashboard 140, the query 144 may include a request to view a readiness of control policies 136a,b and/or tools 138a,b for a particular attack pattern (e.g., an attack pattern 204 of FIG. 2) known to be employed by a given attack group 114a,b. In response, the controls health dashboard 140 identifies the portion of the attack controls superset 120 that is associated with this attack pattern or attack group 114a,b and generates a representation 146 that presents the requested information. An example of such a representation 146 is presented in TABLE 1 below, which shows the different tools 138a,b (i.e., Tools A and B) and control policies 136a,b (i.e., Policies A, B, C, and D) that can be used to protect against attacks from the attack group 114a,b known to use the Attack Technique A (i.e., by implementing Mitigation A). This example representation 146 allows the user 142 to efficiently view the available tools 138a,b for protecting against an attack by Attack Group A.

TABLE 1

Example representation for an example query requesting to view readiness to attacks based on attack pattern or attack group.

| Attack pattern | Mitigation | Attack Technique | Tool | Controls Policy |
|---|---|---|---|---|
| Attack Pattern or Group A | Mitigation A | Attack Technique A | Tool A | Policy A |
| Attack Pattern or Group A | Mitigation A | Attack Technique A | Tool A | Policy B |
| Attack Pattern or Group A | Mitigation A | Attack Technique A | Tool A | Policy C |
| Attack Pattern or Group A | Mitigation A | Attack Technique A | Tool B | Policy D |

In another example of operating the controls health dashboard 140, the query 144 may include a request to view a readiness of the control tools 138a,b for protecting against attacks associated with a particular attack technique 130. In response, the controls health dashboard 140 identifies the portion of the attack controls superset 120 that is associated with this attack technique 130 and generates a representation 146 that presents the requested information. An example of such a representation 146 is presented in TABLE 2 below, which shows the different tools 138a,b (i.e., Tools A and B) which implement the mitigation 132 (i.e., Mitigation A) for protecting against attacks employing attack technique 130 (i.e., Attack Technique A) and controls policies 136a,b, which include the tools 138a,b for protecting against the attacks. This example representation 146 allows the user 142 to efficiently view the readiness of the system 100 to protect against an attack employing Attack Technique A.

TABLE 2

Example representation for an example query requesting to
view readiness to attacks based on particular attack technique.

| Attack Technique | Mitigation | Tool | Controls Policy |
|---|---|---|---|
| Attack Technique A | Mitigation A | Tool A | Policy 1 |
| Attack Technique A | Mitigation A | Tool B | Policy 1 |
| Attack Technique A | Mitigation A | Tool B | Policy 2 |
| Attack Technique A | Mitigation A | Tool B | Policy 3 |

In yet another example of operating the controls health dashboard 140, the query 144 may include a request to view a readiness to implement a particular mitigation 132. In response, the controls health dashboard 140 identifies the portion of the attack controls superset 120 that is associated with this attack mitigation 132 and generates a representation 146 that presents the requested information. An example of such a representation 146 is presented in TABLE 3 below, which shows the different tools 138a,b (i.e., Tools A, B, C, and D) which implement the mitigation 132 (i.e., Mitigation A) and mitigation scores 118 determined for these tools 138a,b. The example representation of TABLE 3 also shows the sources 106 of telemetry data 112 used to determine the mitigation scores 118. This example representation 146 allows the user 142 to efficiently view the readiness of the system 100 to perform Mitigation A and may be used to identify possible gaps in available telemetry data 112 for evaluating the performance of existing tools 138a,b for performing Mitigation A. For instance, a user 142 viewing the example representation 146 of TABLE 3 may determine that Tool D should not be used to implement Mitigation A because the mitigation score 118 of 15 for Tool D is relatively low (e.g., less than a threshold value). The user 142 may similar determine that a telemetry source 106 should be identified for monitoring the performance of Tool A.

TABLE 3

Example representation for an example query requesting to
view readiness to perform a particular mitigation.

| Mitigation | Telemetry Source(s) | Mitigation Score | Tool |
|---|---|---|---|
| Mitigation A | none | none | Tool A |
| Mitigation A | Source A | 55 | Tool B |
| Mitigation A | Sources B and C | 90 | Tool C |
| Mitigation A | Source D | 15 | Tool D |

Example Methods of Operating Attack Readiness System

FIG. 3 illustrates an example method 300 of determining the attack controls superset 120 of FIG. 1. The method 300 may be implemented by the controls monitor 116 of FIG. 1 At step 302, the controls monitor 116 receives attack data 122. For example, the controls monitor 116 may intermittently access the attack database 126 and check for updates to the attack profiles 128, attack techniques 130, and/or mitigations 132. In some cases, the attack database 126 may automatically provide the attack data 122 to the controls monitor 116 following changes to information stored in the attack database 126. As described above with respect to FIGS. 1 and 2, the attack data 122 generally includes information associated with the types and characteristics of attacks by attack groups 114a,b. For example, the attack data 122 may include the attack profiles 128, attack techniques 130, and mitigations 132 described above with respect to FIG. 1. As described with respect to FIG. 2 above, the attack data 122 may include a set of attack groups 202 (e.g., represented by the set G of attack group identifiers described above), set of attack patterns 204 (e.g., represented by the set A of attack pattern identifiers), a set of attack techniques 206 (e.g., represented by the set T of attack technique identifiers), and a set of mitigations 208 (e.g., represented by the set M of mitigation identifiers).

At step 304, the controls monitor 116 receives the controls data 124. For example, the controls monitor 116 may intermittently access the controls database 134 and check for updates to the controls policies 136a,b and/or tools 138a,b. In some cases, the controls database 134 may automatically provide the controls data 124 following changes to information stored in the controls database 134. As described above with respect to FIGS. 1 and 2, the controls data 124 may include information about the controls policies 136a,b and associated tools 138a,b. For example, the controls data 124 may include a set of tools 210 (e.g., represented by the set D of tool identifiers), a set of telemetry source identifiers (e.g., represented by the set X of telemetry source identifiers), and a set of policies 212 (e.g., represented by the set P of control policy identifiers).

At step 306, the controls monitor determines the attack controls superset 120. For example, as described above with respect to FIG. 1, the controls monitor 116 may combine the attack data 122 and the controls data 124 (e.g., by combining the various sets of information 202, 204, 206, 208, 210, 212 illustrated in FIG. 2). For instance, the controls monitor 116 may determine the union XP of the set X of identifiers of sources 106 of telemetry data 112 and the set P of identifiers of the controls policies 136a,b included in the controls database 134. As described above, the attack controls superset 120 ($\varphi$) may then be determined according to:

$$\varphi = G \times A \times T \times M \times D \times XP.$$

At step 308, the controls monitor receives telemetry data 112 from one or more target devices. For example, the telemetry data 112 may be received intermittently and/or on a predefined schedule. In some cases, each target device 102 may push telemetry data 112 to the controls monitor 116 following a change at a telemetry source 106 (e.g., a change to the tool logs 108a and/or event log 108b). For example, if an event included in the event log 108b is associated with a detected attack associated with a known attack technique 130, the target device 102 may automatically provide telemetry data 112 associated with the detected attack.

At step 310, the controls monitor 116 determines one or more mitigation scores 118 based on the telemetry data 112 received at step 308. For example, as described above with respect to FIG. 1, the controls monitor 116 may determine a mitigation score 118 by detecting events associated with possible attempts to access the secure data 110 using one of the attack techniques 130, determining a mitigation 132 that corresponds to the attack technique 130 and a corresponding tool 104 being executed by the target device 102 to implement the determined mitigation 132, and determining the mitigation score 118 as a percentage of the detected events prevented by the determined tool 104. The mitigation score 118 generally corresponds to a measure of the effectiveness of a given tool 104 or 138a,b for protecting against attacks.

At step 312, the controls monitor 116 associates the mitigation scores 118 from step 310 with the attack controls superset 120 from step 306. For example, the mitigation scores 118 may be included in the superset 120 by determining a product of the set of mitigation scores 118 determined at step 310 with the attack controls superset 120 determined at step 206. At step 314, the controls monitor 116 determines if new telemetry data 112 has been received or is available. For instance, one or more target devices 102 may have new telemetry data 112 such that the mitigation scores 118 should be updated to reflect the new telemetry data 112. If new telemetry data 112 is available or received, the controls monitor 116 proceeds to step 316 and determines new and/or updated mitigation scores 118, which may be included in the attack controls superset 120 at step 312. Otherwise, if no new telemetry data 112 is available, the method 300 may end.

FIG. 4 illustrates an example method of operating the controls health dashboard 140 of FIG. 1. At step 402, the controls health dashboard 140 receives a query 144. The query 144 may include, for example, a request for information related to the readiness of the various controls policies 136a,b and/or tools 138a,b for protecting against various attacks (e.g., attack groups 114a,b and/or attack techniques 130) and/or for implementing various mitigations 132.

In response to the query 144, the controls health dashboard 140 accesses the attack controls superset 120 at step 404 and identifies a portion of the superset 120 that corresponds to the query 144 at step 406. For example, the controls health dashboard 140 may identify, based on keywords identified in the query 144, a set of the attack controls superset 120 (e.g., may identify one of the sets of information 202, 204, 206, 208, 210, 212) to use as a prime index, and determine portions of the other sets of the superset 120 that are associated with that prime index. For instance, in the example of TABLE 2 described above, the prime index is the set of possible tools 138a,b (e.g., the set of tools 210 of FIG. 2) and other portions of the superset 120 related to these tools 138a,b are identified for generation of the presentation 146.

At step 408, the controls health dashboard 140 presents a representation 146 based on the identified portion of the attack controls superset 120 from step 406. Example representations 146 are shown in TABLES 1, 2, and 3 described above. While the example representations 146 described above are tables of information, it should be understood that the representations 146 may include the requested information in any appropriate format (e.g., one or more lists, graphs, etc.).

Example Device(s)

FIG. 5 is an embodiment of a device 500 which may be used to implement various components of the system 100 illustrated in FIG. 1. For example, each of the target devices 110, the controls monitor 116, the databases 126, 134, and the controls dashboard 140 of FIG. 1 may be implemented using a corresponding device 500 or a corresponding collection/combination of devices 500. The device 500 includes a processor 502, a memory 504, and a network interface 506. The device 500 may be configured as shown or in any other suitable configuration.

The processor 502 comprises one or more processors operably coupled to the memory 504. The processor 502 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 502 may be a programmable logic device, a microcontroller, a microprocessor, or any suitable combination of the preceding. The processor 502 is communicatively coupled to and in signal communication with the memory 504 and the network interface 506. The one or more processors are configured to process data and may be implemented in hardware or software. For example, the processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 2 and 3. In some embodiments, the function described herein is implemented using logic units, FPGAs, ASICs, DSPs, or any other suitable hardware or electronic circuitry.

The memory 504 is operable to store any of the information described above with respect to FIGS. 1-4 along with any other data, instructions, logic, rules, or code operable to implement the function(s) described herein when executed by processor 502. For example, the memory 504 may store the telemetry data 12, attack data 122, controls data 124, attack controls superset 120, mitigation scores 118, and the representation 146. The memory 504 may further store tool instructions 508, which include instructions for executing the various security tools 104 and 138a,b described in this disclosure. For instance, the tool instructions 508 may include appropriate code for implementing methods of mitigations 132 associated with the tools 104 and 138a,b. The memory 504 may further store query handling instructions 510, which include instructions for interpreting a query 144, for instance, by identifying keywords in the query 144 and associating these keywords to appropriate portions of the superset 120 which should be included in the representation 146. The memory 504 may further store dashboard instructions 512, which include instructions for executing the controls health dashboard 140. For instance, the dashboard instructions 512 may include appropriate code for implementing the various functions of the controls health dashboard described above with respect to FIGS. 1 and 4. The memory 504 comprises one or more disks, tape drives, or solid-state drives, and may be used as an over-flow data storage device, to store programs when such programs are selected for execution, and to store instructions and data that are read during program execution. The memory 504 may be volatile or non-volatile and may comprise read-only memory (ROM), random-access memory (RAM), ternary content-addressable memory (TCAM), dynamic random-access memory (DRAM), and static random-access memory (SRAM).

The network interface 506 is configured to enable wired and/or wireless communications. The network interface 506 is configured to communicate data between the device 500 and other network devices, systems, or domain(s). For example, the network interface 506 may comprise a WIFI interface, a local area network (LAN) interface, a wide area network (WAN) interface, a modem, a switch, or a router. The processor 502 is configured to send and receive data using the network interface 506. The network interface 506 may be configured to use any suitable type of communication protocol as would be appreciated by one of ordinary skill in the art.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system, comprising:
    a target device storing secure information and one or more security tools configured to protect against unauthorized access of the secure information;
    a first database configured to store profiles for each of a set of predefined attack groups, each profile comprising a set of attack techniques used by the corresponding attack group and, for each attack technique, a corresponding set of mitigations, wherein each mitigation of the set of mitigations corresponds to a predefined approach to protecting against the attack technique, wherein each attack technique corresponds to an approach to accessing the secure information stored by the target device;
    a second database configured to store control policies, wherein each control policy is associated with a set of security tools that protect against unauthorized access of the secure information stored by the target device, wherein each security tool is configured to implement at least one mitigation of the set of mitigations included in the profiles;
    a controls monitoring device coupled to the first database and second database and comprising a processor configured to:
        receive the profiles from the first database;
        receive the control policies from the second database;
        determine, based on the received profiles and the received control policies, an attack controls superset, wherein the attack controls superset comprises the set of predefined attack groups, the set of attack techniques, the set of mitigations, and the set of security tools; and
    a controls health dashboard coupled to the controls monitoring device and comprising a processor configured to:
        receive a user query associated with one or more of the controls policies or the attack groups;
        receive telemetry data associated with whether attacks associated with the set of attack techniques have been successfully prevented by the one or more security tools of the target device;
        determine, based on the received telemetry data, a set of mitigation scores for the one or more security tools of the target device, wherein the set of mitigation scores correspond to a measure of effectiveness of the one or more security tools for protecting against the attacks associated with the set of attack techniques; and
        include the set of mitigation scores in the attack controls superset by determining a product of the set of mitigation scores with the attack controls superset; and
        provide a representation of a portion of the attack controls superset that is associated with the received query, wherein the representation comprises the one or more security tools, the set of mitigation scores determined for the one or more security tools, and the telemetry data used to determine the set of mitigation scores.

2. The system of claim 1, the processor of the controls monitoring device further configured to determine the set of mitigation scores for the one or more security tools of the target device by:
    detecting events associated with possible attempts to access the secure information using a technique of the set of attack techniques;
    determining, for each detected event, a corresponding mitigation of the set of mitigations and a corresponding security tool of the one or more security tools of the target device that implement the determined mitigation; and
    determining a mitigation score of the set of mitigation scores as a percentage of the detected events prevented by the determined security tool.

3. The system of claim 1, the processor of the controls health dashboard further configured to:
    receive a second query regarding a first controls policy; and
    in response to the second query, provide a second representation including one or more of: a subset of the security tools associated with the first controls policy, a subset of the mitigations associated with the first controls policy, a subset of the attack techniques associated with the first controls policy, and a subset of the attack groups associated with the first controls policy.

4. The system of claim 1, the processor of the controls health dashboard further configured to:
    receive a second query regarding a readiness of a first control policy to attacks by a first attack group; and
    in response to the second query:
        identify, from within the attack controls superset, a subset of the set of attack techniques that is associated with the first attack group;
        identify, from within the attack controls superset, a subset of the set of mitigations that is associated with protecting against attacks using the identified subset of the set of attack techniques that is associated with the first attack group;
        identify, from within the attack controls superset, a subset of the set of security tools that is associated with implementing the identified subset of the set of mitigations;
        identify a mitigation score for at least a portion of the identified subset of the set of security tools; and
        provide a first representation comprising the identified mitigations scores.

5. The system of claim 1, the processor of the controls monitoring device further configured to:
    intermittently receive new telemetry data associated with whether attacks associated the set of attack techniques have been successfully prevented by the one or more security tools of the target device;
determine, based on the new telemetry data, a set of updated mitigation scores for the one or more security tools of the target device; and
update the set of mitigation scores to include the new mitigation scores in the attack control superset.

6. The system of claim 1, the processor of the controls monitoring device further configured to determine the attack controls superset by:
determining a union of a set of telemetry data source identifiers and a set of control policy identifiers; and
determining a product of the set of predefined attack groups, the set of attack techniques, the set of mitigations, the set of security tools, and the determined union.

7. A method comprising:
storing, in a first database, profiles for each of a set of predefined attack groups, each profile comprising a set of attack techniques used by the corresponding attack group and, for each attack technique, a corresponding set of mitigations, wherein each mitigation of the set of mitigations corresponds to a predefined approach to protecting against the attack technique, wherein each attack technique corresponds to an approach to accessing secure information stored by a target device, wherein the target device comprises one or more security tools configured to protect against unauthorized access of the secure information;
storing, in a second database, control policies, wherein each control policy is associated with a set of security tools that protect against unauthorized access of the secure information stored by the target device, wherein each security tool is configured to implement at least one mitigation of the set of mitigations included in the profiles;
determining, based on the profiles and the control policies, an attack controls superset, wherein the attack controls superset comprises the set of predefined attack groups, the set of attack techniques, the set of mitigations, and the set of security tools; and
receiving a user query associated with one or more of the controls policies or the attack groups;
receiving telemetry data associated with whether attacks associated with the set of attack techniques have been successfully prevented by the one or more security tools of the target device;
determining, based on the received telemetry data, a set of mitigation scores for the one or more security tools of the target device, wherein the set of mitigation scores correspond to a measure of effectiveness of the one or more security tools for protecting against the attacks associated with the set of attack techniques; and
including the set of mitigation scores in the attack control superset by determining a product of the set of mitigation scores with the attack controls superset; and
providing a representation of a portion of the attack controls superset that is associated with the received query, wherein the representation comprises the one or more security tools, the set of mitigation scores determined for the one or more security tools, and the telemetry data used to determine the set of mitigation scores.

8. The method of claim 7, the processor of the controls monitoring device further configured to determine the set of mitigation scores for the one or more security tools of the target device by:
detecting events associated with possible attempts to access the secure information using a technique of the set of attack techniques;
determining, for each detected event, a corresponding mitigation of the set of mitigations and a corresponding security tool of the one or more security tools of the target device that implement the determined mitigation; and
determining a mitigation score of the set of mitigation scores as a percentage of the detected events prevented by the determined security tool.

9. The method of claim 7, further comprising:
receiving a second query regarding a first controls policy; and
in response to the second query, providing a second representation including one or more of: a subset of the security tools associated with the first controls policy, a subset of the mitigations associated with the first controls policy, a subset of the attack techniques associated with the first controls policy, and a subset of the attack groups associated with the first controls policy.

10. The method of claim 7, further comprising:
receiving a second query regarding a readiness of a first control policy to attacks by a first attack group; and
in response to the second query:
identifying, from within the attack controls superset, a subset of the set of attack techniques that is associated with the first attack group;
identifying, from within the attack controls superset, a subset of the set of mitigations that is associated with protecting against attacks using the identified subset of the set of attack techniques that is associated with the first attack group;
identifying, from within the attack controls superset, a subset of the set of security tools that is associated with implementing the identified subset of the set of mitigations;
identifying a mitigation score for at least a portion of the identified subset of the set of security tools; and
providing a second representation comprising the identified mitigations scores.

11. The method of claim 7, further comprising:
intermittently receiving new telemetry data associated with whether attacks associated the set of attack techniques have been successfully prevented by the one or more security tools of the target device;
determining, based on the new telemetry data, a set of updated mitigation scores for the one or more security tools of the target device; and
updating the set of mitigation scores to include the new mitigation scores in the attack control superset.

12. The method of claim 7, the further comprising determining the attack controls superset by:
determining a union of a set of telemetry data source identifiers and a set of control policy identifiers; and
determining a product of the set of predefined attack groups, the set of attack techniques, the set of mitigations, the set of security tools, and the determined union.

13. A device comprising:
a memory configured to store:
profiles for each of a set of predefined attack groups, each profile comprising a set of attack techniques used by the corresponding attack group and, for each attack technique, a corresponding set of mitigations, wherein each mitigation of the set of mitigations corresponds to a predefined approach to protecting against the attack technique, wherein each attack technique corresponds to an approach to accessing secure information stored by a target device, the target device storing secure information and one or more security tools configured to protect against unauthorized access of the secure information; and store control policies, wherein each control policy is associated with a set of security tools that protect against unauthorized access of the secure information stored by the target device, wherein each security tool is configured to implement at least one mitigation of the set of mitigations included in the profiles;

a processor coupled to the memory and configured to:
receive the profiles and control policies;
determine, based on the received profiles and the received control policies, an attack controls superset, wherein the attack controls superset comprises the set of predefined attack groups, the set of attack techniques, the set of mitigations, and the set of security tools;
receive a user query associated with one or more of the controls policies or the attack groups;
receive telemetry data associated with whether attacks associated with the set of attack techniques have been successfully prevented by the one or more security tools of the target device;
determine, based on the received telemetry data, a set of mitigation scores for the one or more security tools of the target device, wherein the set of mitigation score corresponds to a measure of effectiveness of the one or more security tools for protecting against the attacks associated with the set of attack techniques; and
include the set of mitigation scores in the attack control superset by determining a product of the set of mitigation scores with the attack controls superset; and
provide a representation of a portion of the attack controls superset that is associated with the received query, wherein the representation comprises the one or more security tools, the set of mitigation scores determined for the one or more security tools, and the telemetry data used to determine the set of mitigation scores.

14. The device of claim 13, the processor further configured to determine the set of mitigation scores for the one or more security tools of the target device by:
detecting events associated with possible attempts to access the secure information using a technique of the set of attack techniques;
determining, for each detected event, a corresponding mitigation of the set of mitigations and a corresponding security tool of the one or more security tools of the target device that implement the determined mitigation; and
determining a mitigation score of the set of mitigation scores as a percentage of the detected events prevented by the determined security tool.

15. The device of claim 13, the processor further configured to:
receive a second query regarding a first controls policy; and
in response to the second query, provide a second representation including one or more of: a subset of the security tools associated with the first controls policy, a subset of the mitigations associated with the first controls policy, a subset of the attack techniques associated with the first controls policy, and a subset of the attack groups associated with the first controls policy.

16. The device of claim 13, the processor further configured to:
receive a second query regarding a readiness of a first control policy to attacks by a first attack group; and
in response to the second query:
identify, from within the attack controls superset, a subset of the set of attack techniques that is associated with the first attack group;
identify, from within the attack controls superset, a subset of the set of mitigations that is associated with protecting against attacks using the identified subset of the set of attack techniques that is associated with the first attack group;
identify, from within the attack controls superset, a subset of the set of security tools that is associated with implementing the identified subset of the set of mitigations;
identify a mitigation score for at least a portion of the identified subset of the set of security tools; and
provide a first representation comprising the identified mitigations scores.

17. The device of claim 13, the processor further configured to:
intermittently receive new telemetry data associated with whether attacks associated the set of attack techniques have been successfully prevented by the one or more security tools of the target device;
determine, based on the new telemetry data, a set of updated mitigation scores for the one or more security tools of the target device; and
update the set of mitigation scores to include the new mitigation scores in the attack control superset.

* * * * *